United States Patent
Bell et al.

(10) Patent No.: US 7,865,176 B2
(45) Date of Patent: Jan. 4, 2011

(54) ALERTS BASED ON SIGNIFICANCE OF FIXED FORMAT SMS TEXT MESSAGES

(75) Inventors: David Rowland Bell, Hampshire (GB); John Brian Pickering, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 666 days.

(21) Appl. No.: 11/930,266

(22) Filed: Oct. 31, 2007

(65) Prior Publication Data

US 2009/0111490 A1 Apr. 30, 2009

(51) Int. Cl.
*H04M 1/725* (2006.01)
(52) U.S. Cl. .................... 455/412.1; 455/466; 455/567
(58) Field of Classification Search ... 455/412.1–412.2, 455/466, 550.1–553.1, 556.2, 576; 709/206
See application file for complete search history.

(56) References Cited

U.S. PATENT DOCUMENTS 6,032,039 A * 2/2000 Kaplan .................... 455/412.2
6,484,033 B2 * 11/2002 Murray ....................... 455/466
2003/0065738 A1 * 4/2003 Yang et al. ................... 709/215
2007/0238459 A1 * 10/2007 Daigle ..................... 455/435.3

* cited by examiner

Primary Examiner—Kamran Afshar
(74) Attorney, Agent, or Firm—Schmeiser, Olsen & Watts; Dermott Cooke

(57) ABSTRACT

A method and system for processing a fixed format short message service (SMS) text message for alerting a user of a mobile phone to significant information in the message received by the mobile phone. Program code stored in memory on the mobile phone executes the method on a processor. A value of each preset variable of at least two preset variables is retrieved from the memory on the mobile phone. The mobile phone receives the message from a sender. The message is ascertained to be significant by ascertaining that the received message passes at least one test. Each test utilizes at least one aspect of the received message and the retrieved value of at least one preset variable. Responsive to the ascertaining, default handset settings of the mobile phone are overridden and the user is alerted by an audio tone or vibration that the received message is significant.

7 Claims, 3 Drawing Sheets

ALERTS BASED ON SIGNIFICANCE OF FIXED FORMAT SMS TEXT MESSAGES

FIELD OF THE INVENTION

This invention relates to the processing of fixed format short message service (SMS) text messages for alerting a user of a mobile phone to significant information being received by the mobile phone.

BACKGROUND OF THE INVENTION

The arrival of incoming short message service (SMS) messages to a mobile phone can be signaled to the user playing an alert, such as a tone or tone sequence, vibrating the handset, and so forth. The settings for these alerts may be controlled by the central service provider or the user. Unfortunately, these alerts may not distinguish different incoming SMS messages in terms of their relative importance to the user.

Thus, there is a need for a method and system that distinguishes different incoming SMS messages in terms of their relative importance to the user.

SUMMARY OF THE INVENTION

The present invention provides a method for processing a fixed format short message service (SMS) text message for alerting a user of a mobile phone to significant information in the fixed format SMS text message being received by the mobile phone, said method performed by executing program code on a processor in the mobile phone, said program code being stored in memory on the mobile phone, said method comprising:

retrieving, from the memory on the mobile phone, a value of each preset variable of a plurality of preset variables;

receiving, by the mobile phone from a sender, the fixed format SMS text message;

ascertaining that the received message is significant by ascertaining that the received message passes at least one test, each test utilizing at least one aspect of the received message and the retrieved value of at least one preset variable of the plurality of preset variables; and responsive to said ascertaining, alerting the user by an audio tone or vibration that the received message is significant.

The present invention provides a method for processing a fixed format short message service (SMS) text message for alerting a user of a mobile phone to significant information in the fixed format SMS text message being received by the mobile phone, said fixed format SMS text message relating to a score in a sports event having a home team playing a visiting team, said method performed by executing program code on a processor in the mobile phone, said program code being stored in memory on the mobile phone, said method comprising:

retrieving, from the memory on the mobile phone, a value of each preset variable of a plurality of preset variables;

receiving, by the mobile phone from a sender, the fixed format SMS text message;

ascertaining that the received message is significant by ascertaining that the received message passes at least one test;

responsive to said ascertaining, alerting the user by an audio tone or vibration that the received message is significant;

wherein said at least one test consists of a first test, a second test, a third test, and a fourth test without regard to an order in which said ascertaining ascertains that the received message passes the first test, the second test, the third test, and the fourth test;

wherein the plurality of preset variables comprises DIALLING NUMBER, NUMBERS, THRESHOLD, FREQUENCY, FORM, DEVIATION, DURATION, and CRITICAL TIME;

wherein DIALLING NUMBER comprises one or more fixed format SMS text message sender's phone numbers;

wherein NUMBERS comprise a number of said DIALLING NUMBERs having same or similar information;

wherein THRESHOLD is a minimum number of senders to be added to NUMBERS for defining the first test;

wherein FREQUENCY is a threshold number of fixed format SMS text messages that may be received from a single fixed format SMS text message sender's phone number of said DIALLING NUMBER per time period for defining the second test;

wherein FORM describes an expected format of the message and includes a prior score of both the home team and the visiting team;

wherein DEVIATION is a minimum value for a sum of an increase in a score of the home team and the visiting team for defining the third test;

wherein DURATION is an expected duration of the sports event;

wherein CRITICAL TIME is a period of time on either side of an end time of the sports event for defining the fourth test;

wherein said ascertaining that the received message passes the first test comprises ascertaining that of fixed format SMS text messages that may be received from a single messages having same or similar information as the received message has been received by the mobile phone from at least (NUMBER+THRESHOLD) of fixed format SMS text messages that may be received from a single message senders.

wherein said ascertaining that the received message passes the second test comprises ascertaining that a number of fixed format SMS text messages that may be received from a single messages received from a single DIALLING NUMBER per time period exceeds FREQUENCY.

wherein said ascertaining that the received passes the third test comprises ascertaining that the sum of an increase in the score of the home team and the visiting is at least DEVIATION;

wherein the method further comprises retrieving, from the memory on the mobile phone, a START TIME denoting a time at which the sports event has started and computing the end time as a sum of START TIME and DURATION;

wherein said ascertaining that the received message passes the fourth test comprises ascertaining that a time at which the message was received is within the CRITICAL TIME of the computed end time.

The present invention advantageously provides a method and system that distinguishes different incoming SMS messages in terms of their relative importance to the user.

DETAILED DESCRIPTION OF THE INVENTION

The present invention relates to processing fixed format short message service (SMS) text signals received by a mobile phone (e.g., cellular phone, smartphone, etc.) to override handset settings and alert the user to significant information in accordance with local, user-specified profile settings. In one embodiment, an SMS message is a text message of up to 160 characters and up to 224 characters if using a 5 bit mode. The scope of the present invention includes an SMS message of up to any number of text characters in active usage in the field of SMS messaging. Note that messages over 160 text characters (or over any other maximum number of text characters) may be handled by being automatically split by a service provider that controls transmission of the SMS text message.

A fixed format SMS text message is defined herein as a SMS text message that comprises a predefined sequence of successive text fields, wherein the text fields of each pair of successive text fields are separated by a predefined delimiter. In a fixed format SMS text message, the text fields of the predefined sequence of successive text fields may independently be of a predefined fixed length or of a variable length. Also, the fixed format SMS text message may include text characters other than the text characters encompassed by the text fields of the predefined sequence of successive text fields as illustrated by example infra. Thus, a fixed format SMS text message generally comprises a text character string of the form:

<text field 1> <delimiter 1> <text field 2> <delimiter 2> <text field 3> . . . .

The method and system of the present invention is applicable generally to processing a fixed format SMS message of any type. In one embodiment, the message relates to any type of sports event in which two teams are competing and in which the competing is characterized by scores of the two teams as the sports event is played. A team may consist of a single player in some sports events such as boxing and tennis. The scope of the present invention includes any such sports events capable of being scored such as, inter alia, baseball, soccer, USA football, hockey, tennis, basketball, boxing, tennis, bowling, etc. For illustrative purposes, the method of the present invention will illustrated infra for an exemplary embodiment with respect to a soccer game.

Figure 1:
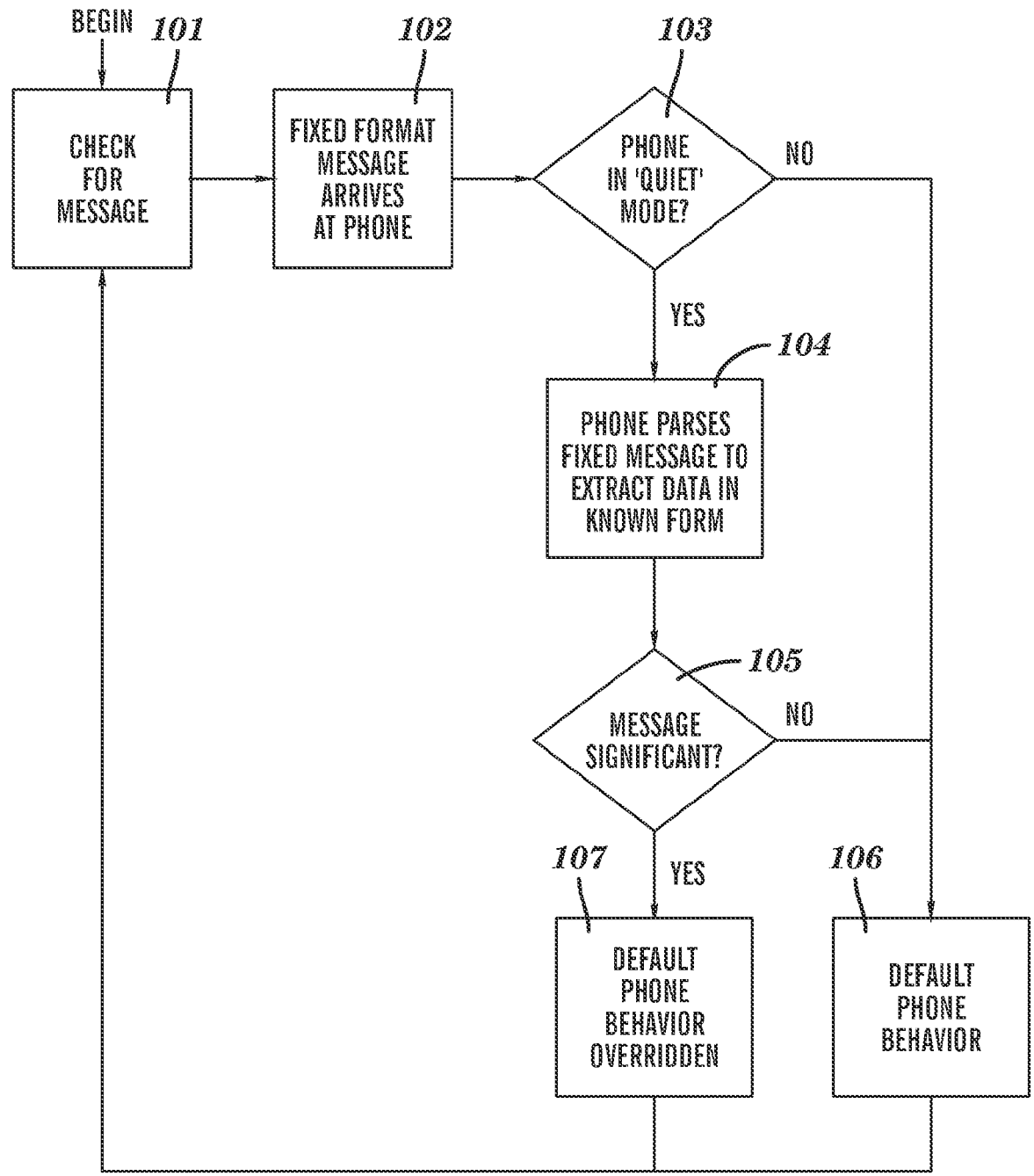
FIG. 1 is a flow chart describing a method for determining from the result of a message significance determination step whether an incoming fixed-format message should override the default handset settings of a mobile phone, in accordance with embodiments of the present invention.

FIG. 1 is a flow chart describing a method for determining from the result of a message significance determination step whether an incoming fixed-format message should lead to the overriding of the default handset settings of a mobile phone, in accordance with embodiments of the present invention.

The mobile phone has an 'audio' mode of operation in which the method of the present invention is not performed and the default settings of the mobile phone's handset are operative to alert the user to all incoming messages by audio means. The mobile phone also has a 'quiet' mode of operation in which the method of the present invention is performed. In the 'quiet mode', no tone is played and no phone vibration is activated unless the default settings of the handset are overridden due to receipt of a significant fixed format SMS message by the mobile phone as determined by the method of the present invention.

Figure 3:
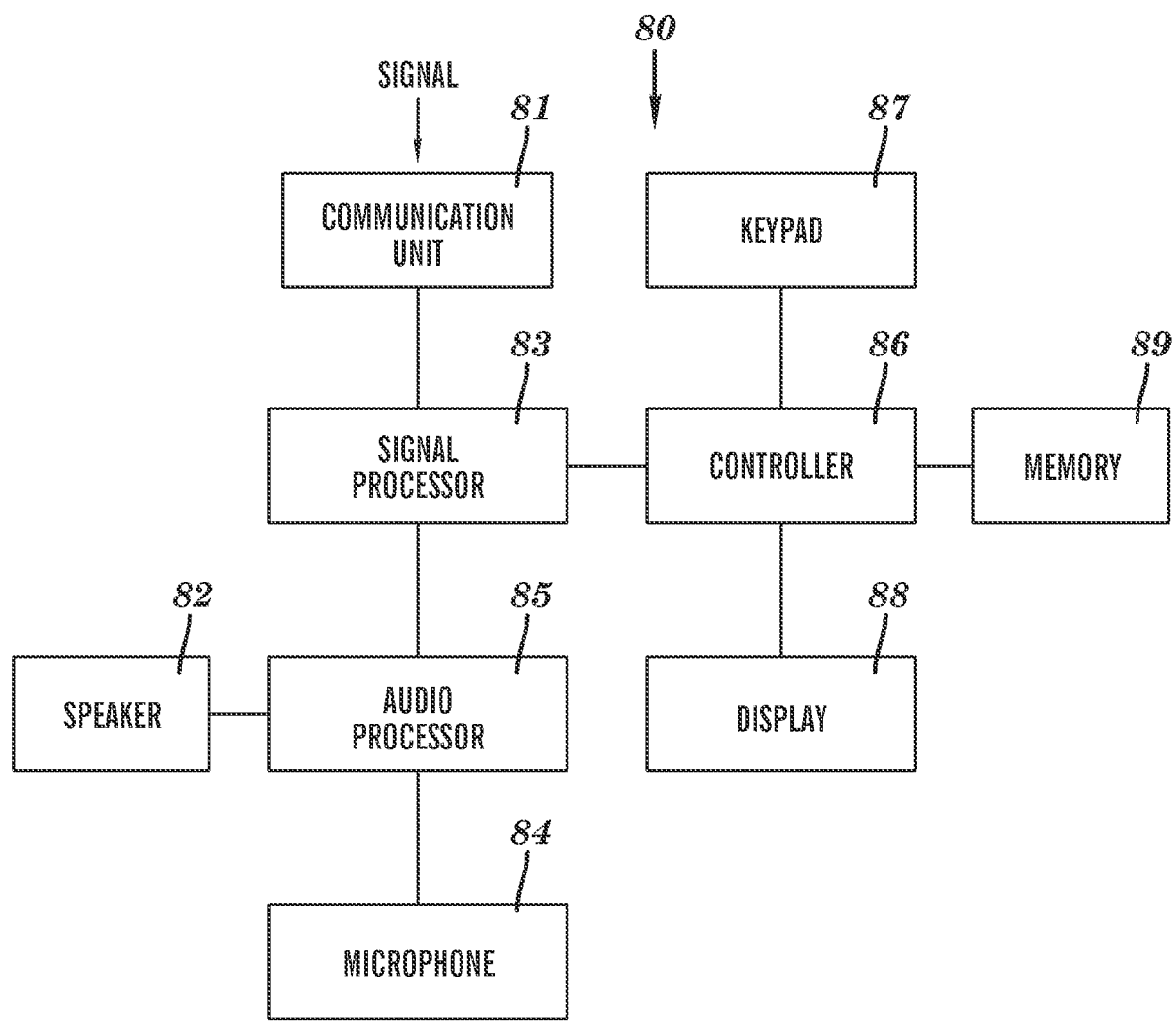
FIG. 3 depicts a system within a mobile telephone, in accordance with embodiments of the present invention.

FIG. 1 comprises steps 101-107 which are performed by the mobile phone system 80 depicted in FIG. 3 and described infra.

Step 101 is a wait loop that checks for a fixed format SMS message received by the mobile phone. After a fixed format SMS message has been received by the mobile phone in step 102, step 103 determines whether the mobile phone is in the 'quiet' mode.

If step 103 determines that the mobile phone is not in the 'quiet' mode (i.e., the mobile phone is in the 'audio' mode), then the handset's normal settings are operative and step 106 is next performed.

If step 103 determines that the mobile phone is in the 'quiet' mode, then step 104 parses the fixed format SMS message to extract data from the message, followed by performance of step 105 which determines whether the received fixed format SMS message is significant. Step 105 is described infra in detail in FIG. 2.

If step 105 determines that the received fixed format SMS message is not significant, then step 106 is next executed. If step 105 determines that the received fixed format SMS message is significant, then step 107 is next executed.

Step 106 implements the default mode of operation of the handset and the method loops back to step 101 to check again for a fixed format SMS message received by the mobile phone.

Step 107 overrides the default handset settings of the mobile phone and alerts the user by an audio tone or vibration to indicate that the message is significant, and the method loops back to step 101 to check again for a fixed format SMS message received by the mobile phone.

By way of example, the following scenario is next described: a user has elected to receive the score line about a soccer game. In soccer, a "goal" adds one point to the score of the team that achieved the goal. The scores are received by the user's mobile phone in a fixed format SMS message such as <home score> <delimiter> <away score> wherein the <home score> is the number of goals for the team hosting the event; <away score> is the number of goals for the visiting team; and <delimiter> is a character to separate the <home score> and the <away score>. Associated with the soccer game is also a finishing or end time which may be calculated as explained infra. The user has decided to switch the user's handset to the "quiet" mode such that the user desires to know what the score is in the soccer game if preset criteria have been satisfied.

Figure 2:
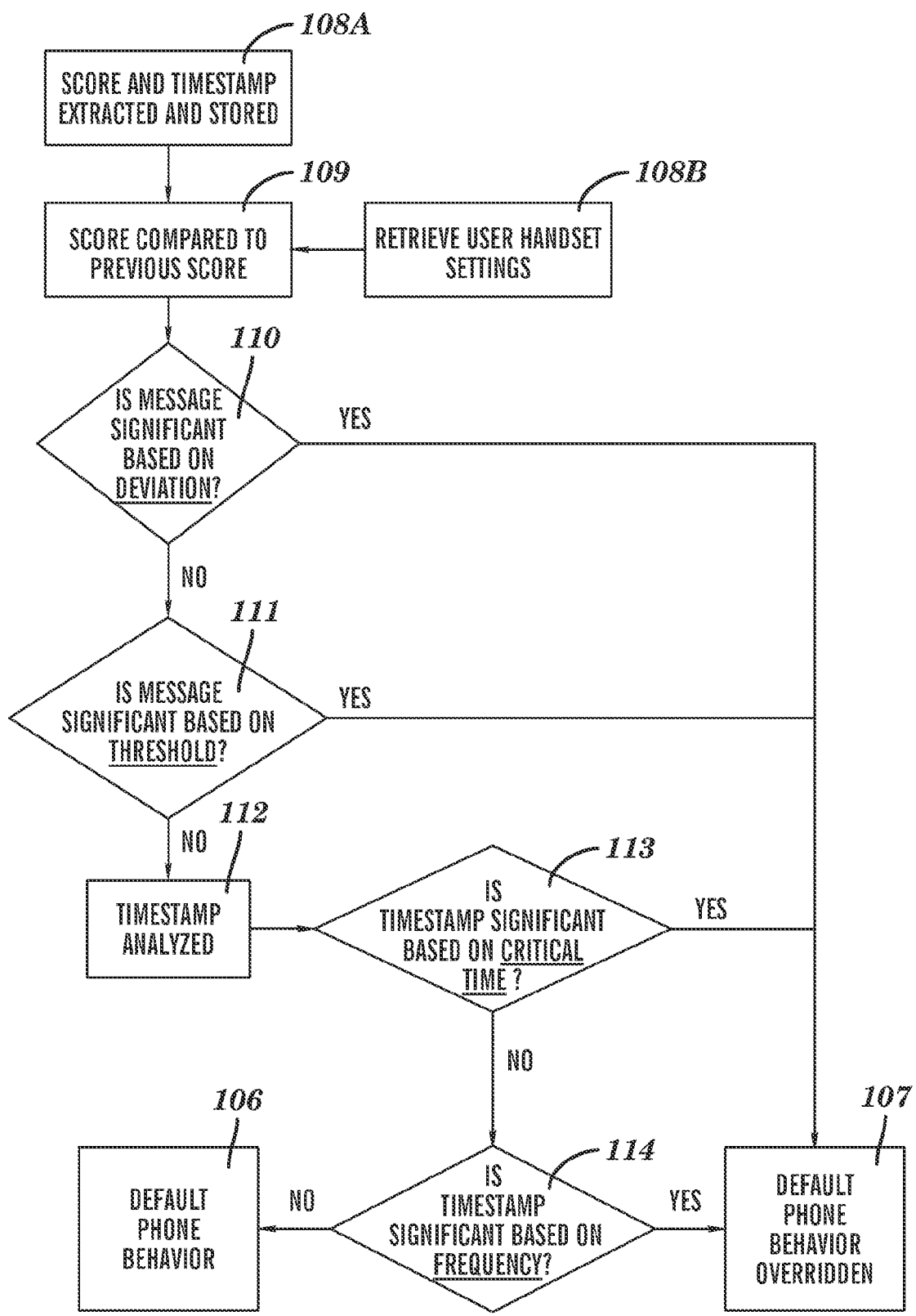
FIG. 2 is a flow chart describing a parsing step and the message significance determination step of FIG. 1, in accordance with embodiments of the present invention.

In determining whether the received fixed format SMS message comprising the score line is significant, the received message is analyzed in detail in FIG. 2 in steps 108-114 and 106-107.

FIG. 2 is a flow chart describing the parsing step and message significance determination step of FIG. 1, in accordance with embodiments of the present invention. Step 108A of FIG. 2 corresponds to step 104 of FIG. 1 and the remaining steps 108B and 109-114 of FIG. 2 correspond to step 105 of FIG. 1.

In step 108A, the content of the message is extracted and associated with a timestamp; e.g.,

DATA <3-2>
TIME <14:30:25> which indicates that at 25 seconds after 14:30, the home team has three goals and the visiting team has two goals. The extracted timestamp and score are stored in memory (e.g., in memory 89: see FIG. 3 described infra). Then the preset variables are retrieved in step 108B for comparison with the currently processed message.

After the content of the message has been extracted and time-stamped in step 108A, the extracted message is compared with the preset variables retrieved in step 108B. Table 1 depicts preset variables reflecting user preferences that may be preset in accordance with embodiments of the present invention.

TABLE 1

Preset Variables.

| Parameter | Value |
| --- | --- |
| DIALLING NUMBER | <123> or <XYZ> |
| NUMBERS | <2> |
| THRESHOLD | <1> |
| FORM | <0-0> |
| DEVIATION | <1> |
| REQUENCY | <3 PER HOUR> |
| CRITICAL TIME | <00:01:00> |
| DURATION | <90 MINS> |

The settings in Table 1 are to be understood as follows: DIALLING NUMBER refers to the source number or numbers associated with the message, and can include the actual number or numbers, a short dial version, or a name or names in the user's directory used to identify the calling number or numbers. DIALLING NUMBER therefore refers to one or more message senders' phone numbers who are expected to send the recipient messages in the fixed format. For example, the user might expect two of the user's friends and the user's brother to send the soccer score to the user. In this case, the user would have three numbers listed under DIALLING NUMBER. The significance of messages received from any other numbers are determined in accordance with the parameters NUMBERS and THRESHOLD. The parameter NUMBERS refers to the number of different DIALLING NUMBERs containing the same (exactly the same content) or similar information (the same content and additional text commenting on the same content). For a sports event, the same information pertains to the score (e.g., the same DATA element) and similar information pertains to a comment on the score. A value of 1 for NUMBERS means that the user expects the same or similar information from a single DIALLING NUMBER, whereas setting NUMBERS to 2 means that the user may receive the same or similar information from 2 message senders. In one embodiment, the parameter NUMBERS refers to the number of different DIALLING NUMBERs containing only the same information and not similar information.

The parameter THRESHOLD is used in connection with the parameter NUMBERS. In particular, when a same or similar message is received from at least (NUMBERS+THRESHOLD) message senders, then the message is regarded as significant in step 105 of FIG. 1. In the example shown in Table 1, with NUMBERS=2 and THRESHOLD=1, then the same or similar message arriving from 3 or more (NUMBERS+THRESHOLD) message senders is regarded as significant.

FORM relates to the expected format of the message. In the example of Table 1, this form is a nil-nil score line; i.e., "0-0". DEVIATION is used in conjunction with FORM to establish when the score in a received message is significant. In particular, if the score in the received message does not conform to FORM (e.g., by the sum of an increase in score of the home team and visiting team being at least DEVIATION or by containing additional information not within the scope of FORM in Table 1), then the message is regarded as significant in step 105 of FIG. 1. In the example of Table 1 wherein DEVIATION=1, a deviation of one or more goals from the zero score in FORM of either team is regarded as significant.

In one embodiment, the sum of an increase in score of the home team and visiting team being at least DEVIATION may be replaced by one of the following condition: (1) an increase in score of the home team being at least DEVIATION; (2) an increase in score of the visiting team (but not both) being at least DEVIATION; (3) an increase in score of either the home team or the visiting team (but not both) being at least DEVIATION.

FREQUENCY indicates a number of messages received from a single DIALLING NUMBER per time period above which the message is significant in step 105 of FIG. 1. In the example of Table 1, if upon receiving a given message from a single DIALLING NUMBER it is determined that the number of such messages that has been received from the single DIALLING NUMBER is at a FREQUENCY exceeding 3 such messages per hour, then the given message is regarded as significant.

In one embodiment, FREQUENCY may be specific to each DIALLING NUMBER, so that if there are three different DIALLING NUMBERs, there will be three associated FREQUENCY values, which reflects different significance levels for messages sent by different senders.

DURATION and CRITICAL TIME are used as time delimiters for the messages. The sum of DURATION and START TIME (see Table 2 discussed infra) identifies the expected end time of the message stream. CRITICAL TIME identifies a period of time on either side of the end time which is considered significant. Thus the period of significance for a message is (START TIME+DURATION±CRITICAL TIME). In the example of Table 1 wherein DURATION is 90 minutes and CRITICAL TIME is 1 minute, assuming the soccer game began at roughly 2:30 PM which is the START TIME, then the expected end time of the soccer game is 4:00 PM (i.e., 2:30 PM plus 90 minutes) and any message received within 1 minute of 4:00 PM (i.e., from 3:59 PM to 4:01 PM) is regarded as significant.

Thus, the preset parameters in Table 1 are used to establish message significance as discussed supra. In addition, a number of dynamic variables are set and updated dynamically in time, as shown in Table 2.

TABLE 2

Dynamic Variables.

| Dynamic Variable | Value |
| --- | --- |
| START TIME | <nn:nn:nn> |
| PREVIOUS TIME | <nn:nn:nn> |
| MESSAGES RECEIVED | <n> |
| DIALLING NUMBERS | <n> |

The dynamic variable START TIME holds the time at which the sporting event begins.

The dynamic variable PREVIOUS TIME holds the time at which the first message holding the same or similar information that is in the currently processed message was received.

The dynamic variable MESSAGES RECEIVED holds the number of messages received since PREVIOUS TIME for each of DIALLING NUMBER in Table 1.

The dynamic variable DIALLING NUMBERS holds the number of source numbers sending the same or similar information that is in the currently processed message.

Step 108B of FIG. 2 retrieves the preset variables of Table 1 to establish message significance as follows:

Step 109 compares the score in the currently processed message to the score in the last previously received message to determine if the score in the currently processed message conforms to FORM. However, if the currently processed message is the first message received, then the preset score in FORM is used as the score in the last previously received message for implementing step 109. Although FORM is preset to a value such as is shown in Table 1, FORM is not a static variable and is updated dynamically with the score in each processed message to avoid repeated alerts as will be illustrated in an example discussed infra. Thus FORM generally comprises a prior score of the home team and the visiting team.

If step 110 determines that the score in the currently processed message does not conform to FORM (e.g., by the sum of an increase in score of the home team and visiting team being at least DEVIATION or otherwise deviating from FORM), then the message is regarded as significant and step 107 is executed to override the default handset settings of the mobile phone and alert the user by an audio tone or vibration to indicate that the message is significant, as discussed supra in conjunction with FIG. 1.

Step 111 determines if the same or similar messages have been received from at least (NUMBERS+THRESHOLD) message senders. If step 111 determines that the same or similar messages has been received from at least (NUMBERS+THRESHOLD) message senders, then the message is regarded as significant and step 107 is executed to override the default handset settings of the mobile phone and alert the user by an audio tone or vibration to indicate that the message is significant as discussed supra in conjunction with FIG. 1.

The timestamp is analyzed in step 112 and step 113 determines if the current time at which the message was received at the mobile phone is within the CRITICAL TIME period of the computed end time (i.e., within the end time computed as the sum of START TIME and DURATION as described supra). If step 113 determines that the current time is within the CRITICAL TIME period of the computed end time, then the message is regarded as significant and step 107 is executed to override the default handset settings of the mobile phone and alert the user by an audio tone or vibration to indicate that the message is significant, as discussed supra in conjunction with FIG. 1.

Step 114 determines if the number of messages received from a single DIALLING NUMBER per time period exceeds FREQUENCY. If step 114 determines that the number of messages received from a single DIALLING NUMBER per time period exceeds FREQUENCY, then the message is regarded as significant and step 107 is executed to override the default handset settings of the mobile phone and alert the user by an audio tone or vibration to indicate that the message is significant, as discussed supra in conjunction with FIG. 1; otherwise step 106 is next executed to implement the default mode of operation of the handset and the method loops back to step 101 in FIG. 1 to again check for a fixed format SMS message received by the mobile phone.

Table 3 presents an example of the preset variables of Table 1 and utilization of these preset variables.

TABLE 3

Example of Preset Variables.

| Parameter | Value |
| --- | --- |
| DIALLING NUMBER | <Rob> <Steve> <Bill> |
| NUMBERS | <2> |
| THRESHOLD | <1> |
| FORM | <1-0> |
| DEVIATION | <1> |
| FREQUENCY | <2 PER HOUR> |

TABLE 3-continued

Example of Preset Variables.

| Parameter | Value |
| --- | --- |
| CRITICAL TIME | <00:05:00> |
| DURATION | <90 MINS> |

In the example of Table 3, the user decides that messages from friends, Rob and Steve, and brother, Bill, of the user are to be treated as especially important; i.e., the user desires to be alerted to messages from this group of Rob, Steve, and Bill. Setting NUMBERS to "2", the user is prepared to receive messages from two other senders without wanting to be alerted. Given the THRESHOLD of 1, however, the user expects to be alerted upon receiving a third message (i.e., NUMBERS+THRESHOLD=2+1=3) from a sender outside of the group of Rob, Steve, and Bill, as well as a fourth message, a fifth message, etc. from additional senders outside of the group of Rob, Steve, and Bill.

Setting DEVIATION to 1 and FORM to '1-0', the user expects to be alerted if the home team scores 2 or more points (i.e., FORM score of home team+DEVIATION=1+1=2), or if the away team scores 1 or more points (i.e., FORM score of away team+DEVIATION=0+1=1). As described supra, in one embodiment of the invention, DEVIATION may be computed for one team's score, for the other team's score or for both.

Setting FREQUENCY to "2 PER HOUR", the user expects no more than two messages in any one hour from a single DIALLING NUMBER. If there are more than two messages per hour from a single DIALLING NUMBER, then the user desires to be alerted, irrespective of whether the single DIALLING NUMBER belongs to Rob, Steve or Bill. Similarly, if any message is received within the CRITICAL TIME period (i.e., 5 minutes in this example) of the end time of the match, then the user will be alerted. Thus, if any messages appear during the period between 85 minutes and 95 minutes from the START TIME, then the user will be alerted; i.e., DURATION±CRITICAL TIME=90 minutes±5 minutes=85 to 95 minutes.

For example, assume that a soccer match begins at 2 pm. This will be alerted to the user and stored in the dynamic parameter START TIME: 14:00:00. The user receives a message from Rob and another message from Steve. The time at which the second of these messages (from Steve) is received is logged in PREVIOUS TIME. But assuming that the score in the messages conform to FORM with respect to DEVIATION, no further action is taken.

Next, the user receives three messages in quick succession from Bill. The time is now 14:45:00. PREVIOUS TIME is set to the timestamp of the most recent (14:45:00), and MESSAGES RECEIVED is now five. The message received rate is then calculated as (5 messages)/(PREVIOUS TIME−START TIME), which is a rate of 6.67 messages per hour (i.e., 5 messages/(45 minutes/60 minutes per hour)) that exceeds the preset FREQUENCY of 2 messages per hour. Therefore, the currently processed message is significant and the default behavior of the handset is overridden and the user is alerted.

The user receives a message from Steve, which reads: "Oh no! Seen the score!?" Since this does not conform to the format shown in FORM (i.e. the score is absent from the message), the message is regarded as significant. Similarly, if the message had read: "New score, mate: 2-1", although it contains a sequence (2-1) which conforms to FORM, the rest of the text does not, and so it is regarded as significant. In either case, step 107 of FIG. 1 overrides the default handset settings of the mobile phone and alerts the user by an audio tone or vibration to indicate that the message is significant.

Similarly, the user receives a message from Rob with the content: <3-2>. This received score comprises a sum (4) of an increase in score of the home team and visiting team of at least the DEVIATION value of 1. In particular, the sum of the increase in score of the home team and visiting team is: (3-1)+(2-0)=2+2=4. In addition to alerting the user, FORM is now reset to <3-2> to avoid repeated alerts.

The preceding example relating to Table 3 illustrates the determination of significance in the message content for fixed-format SMS messages based on the analysis of different available parameters and in different combinations. In this manner, there is a lot of flexibility in enabling a user alert based on the interpretation of significance in the message content. The scope of the present invention includes permitting some parameters to be suppressed which effectively disables under some circumstances alerts that would otherwise be generated. It is permissible to leave out certain parameters to avoid certain types of decision making. For example, DIALLING NUMBER, NUMBERS and THRESHOLD could be omitted resulting in no special significance attached to the senders of the messages. If FREQUENCY were left out, then there would be no need to monitor and maintain PREVIOUS TIME and MESSAGES RECEIVED. If CRITICAL TIME is not specified, then there is no checking whether the message is received close to the end of a match or in "extra time" (the time period beyond START TIME+DURATION, added on to compensate for any delays required when attending to injured players on the pitch).

The preceding examples illustrate how the message content is analyzed and processed in terms of a number of user-defined parameters, such as value, form, frequency, timestamp, etc., to assess message significance. If the message is deemed significant, then the handset settings are overridden and the user is alerted; otherwise, no further action is taken. Thus, the present invention enables the user to set criteria flexibly against which the message content can be examined.

The method in FIG. 2 for assessing message significance comprises four tests for determining if the currently processed message is significant: the DEVIATION test (step 110), the THRESHOLD test (step 112), the CRITICAL TIME test (step 113), and the FREQUENCY test (step 114). Each test utilizes at least one aspect of the message and at least one value of the preset variables in Table 1. The algorithm in FIG. 2 depicts branching to step 107 (to override the default handset settings of the mobile phone and alert the user by an audio tone or vibration to indicate that the message is significant) in response to determining that the message passes any one test of the preceding four tests. Passing a test means satisfying criteria characterizing the test.

However, the scope of the present invention includes an alternative execution of the algorithm in FIG. 2 such that all four of the preceding tests are performed to determine which and how many of the preceding four tests are passed. If at least one test of the preceding four tests is determined to be passed after the preceding four tests have been performed, then the method branches to step 107 to override the default handset settings of the mobile phone and alert the user by an audio tone or vibration to indicate that the message is significant. Additionally, the user could be alerted in a manner that communicates the number (N) of the preceding four tests that have been passed. In one embodiment, the alert may comprise N distinct rings or N distinct vibrations. For example, the message could be regarded as significant with respect to DEVIATION and FREQUENCY in which case N=2, resulting in the alert comprising 2 distinct rings or 2 distinct vibrations.

Although the preceding description of embodiments of the present invention pertains to processing a fixed format SMS message relating to a sports event, the present invention generally relates to processing a fixed format SMS message of any type. Note that the following preset variables in Table 1 need not be specific to sports events and are applicable to any type of fixed format SMS message: DIALLING NUMBER, NUMBERS, THRESHOLD, and FREQUENCY.

FIG. 3 depicts a system 80 within a mobile phone, in accordance with embodiments of the present invention. The system 80 comprises a communication unit 81, a speaker 82, a signal processor, 83, a microphone 84, an audio processor 85, a controller 86, a keypad 87, a display 88, and a memory 89.

The communication unit 81 includes a radio frequency (RF) transmitter for increasing and amplifying the frequency of transmitted signals, and an RF receiver for performing low-noise amplification and for decreasing the frequency of received signals. The signal processor 83 includes a transmitter for encoding and modulating the transmitted signals and a receiver for decoding and demodulating the received signals through use of a modem and a CODEC (i.e., a device or program capable of performing encoding and decoding on a digital data stream or signal).

The audio processor 85 outputs via a speaker 82 audio signals that are output from the signal processor 83, and transfers audio signals that are generated by a microphone 84 to the signal processor 83. A keypad 87 includes function keys and other keys for inputting numbers and characters, and for setting up various functions. The keypad 87 may include keys for shifting positions, message selection, and transmission.

A memory 89, which comprises one or more discrete memory arrays and/or devices distributed within the mobile phone, includes a program memory and a data memory. Program code (i.e., software) is stored in the program memory of the memory 89 for controlling general operations of the mobile phone and for performing the method(s) of the present invention. Input data to the program code and data generated by execution of the program code (including temporary data and output data) are stored in the data memory of the memory 89.

A controller 86 controls overall operations of the mobile telephone and includes a processor for executing instructions comprised by the program code stored in the memory 89. The display 88, under the control of the controller 86, displays messages generated in the course of executing the program code stored in the memory 89.

The user enters input via the keypad 87. The audio processor 85 implements the generation of ring signals, tones, vibrations, etc.

A computer program product comprising a computer readable storage medium located outside of the system 80 may have the program code or a portion thereof stored therein.

While particular embodiments of the present invention have been described herein for purposes of illustration, many modifications and changes will become apparent to those skilled in the art. Accordingly, the appended claims are intended to encompass all such modifications and changes as fall within the true spirit and scope of the invention.

What is claimed is:

1. A method for processing a fixed format short message service (SMS) text message for alerting a user of a mobile phone to significant information in the fixed format SMS text message being received by the mobile phone, said method performed by executing program code on a processor in the mobile phone, said program code being stored in memory on the mobile phone, said method comprising:
- retrieving, from the memory on the mobile phone, a value of each preset variable of a plurality of preset variables;
- receiving, by the mobile phone from a sender, the fixed format SMS text message;
- ascertaining that the received message is significant by ascertaining that the received message passes at least one test, each test utilizing at least one aspect of the received message and the retrieved value of at least one preset variable of the plurality of preset variables; and
- responsive to said ascertaining, alerting the user by an audio tone or vibration that the received message is significant.

2. The method of claim 1,
- wherein the plurality of preset variables comprises DIALLING NUMBER, NUMBERS, and THRESHOLD;
- wherein DIALLING NUMBER comprises one or more fixed format SMS text message sender's phone numbers;
- wherein NUMBERS comprise a number of said DIALLING NUMBERs having same or similar information;
- wherein THRESHOLD is a minimum number of senders to be added to NUMBERS for defining a first test of the at least one test; and
- wherein said ascertaining that the received message passes the first test comprises ascertaining that fixed format SMS text messages having same or similar information as the received message has been received by the mobile phone from at least (NUMBER+THRESHOLD) fixed format SMS text message senders.

3. The method of claim 1,
- wherein the plurality of preset variables comprises FREQUENCY;
- wherein FREQUENCY is a threshold number of fixed format SMS text messages that may be received from a single fixed format SMS text message sender's phone number of said DIALLING NUMBER per time period for defining a first test of the at least one test; and
- wherein said ascertaining that the received message passes the first test comprises ascertaining that a number of fixed format SMS text messages received from a single DIALLING NUMBER per time period exceeds FREQUENCY.

4. The method of claim 1,
- wherein the message relates to a score in a sports event having a home team playing a visiting team;
- wherein the plurality of preset variables comprises FORM and DEVIATION;
- wherein FORM describes an expected format of the message and includes a prior score of both the home team and the visiting team;
- wherein DEVIATION is a minimum value for a sum of an increase in score of the home team and the visiting team for defining a first test of the at least one test; and
- wherein said ascertaining that the received message passes the first test comprises ascertaining that the sum of an increase in the score of the home team and the visiting is at least DEVIATION.

5. The method of claim 1,
- wherein the message relates to a score in a sports event having a home team playing a visiting team;
- wherein the plurality of preset variables comprises DURATION and CRITICAL TIME;
- wherein DURATION is an expected duration of the sports event;
- wherein CRITICAL TIME is a period of time on either side of an end time of the sports event for defining a first test of the at least one test;
- wherein the method further comprises retrieving, from the memory on the mobile phone, a START TIME denoting a time at which the sports event has started and computing the end time as a sum of START TIME and DURATION; and
- wherein said ascertaining that the received message passes the first test comprises ascertaining that a time at which the message was received is within the CRITICAL TIME of the computed end time.

6. A mobile phone comprising a system for processing a fixed format short message service (SMS) text message for alerting a user of a mobile phone to significant information in the fixed format SMS text message being received by the mobile phone, said system comprising software configured to perform the method of claim 1, wherein the software consists of the program code.

7. A method for processing a fixed format short message service (SMS) text message for alerting a user of a mobile phone to significant information in the fixed format SMS text message being received by the mobile phone, said fixed format SMS text message relating to a score in a sports event having a home team playing a visiting team, said method performed by executing program code on a processor in the mobile phone, said program code being stored in memory on the mobile phone, said method comprising:
- retrieving, from the memory on the mobile phone, a value of each preset variable of a plurality of preset variables;
- receiving, by the mobile phone from a sender, the fixed format SMS text message;
- ascertaining that the received message is significant by ascertaining that the received passes at least one test;
- responsive to said ascertaining, alerting the user by an audio tone or vibration that the received message is significant;
- wherein said at least one test consists of a first test, a second test, a third test, and a fourth test without regard to an order in which said ascertaining ascertains that the received message passes the first test, the second test, the third test, and the fourth test;
- wherein the plurality of preset variables comprises DIALLING NUMBER, NUMBERS, THRESHOLD, FREQUENCY, FORM, DEVIATION, DURATION, and CRITICAL TIME;
- wherein DIALLING NUMBER comprises one or more fixed format SMS text message sender's phone numbers;
- wherein NUMBERS comprise a number of said DIALLING NUMBERs having same or similar information;
- wherein THRESHOLD is a minimum number of senders to be added to NUMBERS for defining the first test;
- wherein FREQUENCY is a threshold number of fixed format SMS text messages that may be received from a single fixed format SMS text message sender's phone number of said DIALLING NUMBER per time period for defining the second test;
- wherein FORM describes an expected format of the message and includes a prior score of both the home team and the visiting team;
- wherein DEVIATION is a minimum value for a sum of an increase in a score of the home team and the visiting team for defining the third test;
- wherein DURATION is an expected duration of the sports event;

wherein CRITICAL TIME is a period of time on either side of an end time of the sports event for defining the fourth test;

wherein said ascertaining that the received message passes the first test comprises ascertaining that fixed format SMS text messages having same or similar information as the received message has been received by the mobile phone from at least (NUMBER+THRESHOLD) fixed format SMS text message senders.

wherein said ascertaining that the received message passes the second test comprises ascertaining that a number of fixed format SMS text messages received from a single DIALLING NUMBER per time period exceeds FREQUENCY;

wherein said ascertaining that the received message passes the third test comprises ascertaining that the sum of an increase in the score of the home team and the visiting is at least DEVIATION, wherein the method further comprises retrieving, from the memory on the mobile phone, a START TIME denoting a time at which the sports event has started and computing the end time as a sum of START TIME and DURATION;

wherein said ascertaining that the received message passes the fourth test comprises ascertaining that a time at which the message was received is within the CRITICAL TIME of the computed end time.

* * * * *